3,325,484
PROCESS FOR PREPARING PERIPLOGENIA AND INTERMEDIATES SECURED THEREIN
Romano Deghenghi, Westmount, Quebec, Canada, assignor to American Home Products Corporation, New York, N.Y., a corporation of Delaware
No Drawing. Filed Nov. 10, 1964, Ser. No. 410,306
Claims priority, application Canada, Nov. 15, 1963, 889,205
15 Claims. (Cl. 260—239.55)

The present invention relates to a process for preparing periplogenin, a naturally occurring cardioactive steroid, and to the new intermediates which are used in its preparation.

Periplogenin is the aglycone of periplocin and periplocymarin and is found in those forms in certain kinds of Strophanthus. Periplogenin has been described by Feigl [Biochem. Zeitschr., vol. 2, p. 404 (1907)] as being strongly cardioactive, with a similar kind of activity as that of the Strophanthus and the Digitalis glucosides. L. F. Fieser and M. Fieser, "Steroids," Reinhold Publishing Corporation, New York, 1959, p. 803, list periplocymarin among the cardioactive derivatives of periplogenin with a high degree of activity.

The present invention affords a convenient and efficient process for the production of periplogenin, starting from a well-known and easily accessible starting material. Periplogenin may be represented by the following formula:

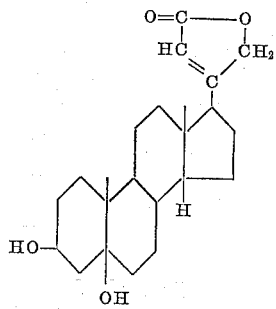

More specifically, desoxycorticosterone is converted to 14α-hydroxy-desoxycorticosterone as described by S. H. Eppstein et al. in J. Am. Chem. Soc. vol. 80, p. 3382 (1958). The latter compound is selectively acetylated in position 21 to yield 14α-hydroxy-desoxycorticosterone 21-acetate (I., R=CH$_3$CO) which is dehydrated to 14-dehydro-desoxycorticosterone acetate (II), also described by H. J. Ringold et al. in U.S. Patent 2,889,346 (June 2, 1959). The latter compound (II) is reduced with lithium aluminum hydride to yield 3β,20β,21 - trihydroxy - 4,14-pregnadiene (III) which is acetylated in the conventional manner to yield the corresponding 3β,20β,21-triacetate (IV, R=CH$_3$CO).

The elements of hypobromous acid are then added to the double bonds at C$^4$–C$^5$ and C$^{14}$–C$^{15}$ of the latter compound, to yield the di-bromohydrin (V, R=CH$_3$CO), 4α,14α-dibromo-3β,5β,15β,20β,21-pentahydroxypregnane 3β,20β,21-triacetate. Treatment of the latter di-bromohydrin with base eliminates the elements of hydrogen bromide and yields, with simultaneous hydrolysis of the ester groups, the di-epoxide (VI), 4β,5β,14β,15β-diepoxy-3β,20β,21-trihydroxy-14-isopregnane. The vicinal hydroxyl groups at C$^{20}$ and at C$^{21}$ of the latter compound are then protected by means of acetonide formation, by treating compound (VI) with acetone and anhydrous copper sulfate, to obtain the corresponding acetonide, 4β,5β,14β,15β-diepoxy-3β - hydroxy - 20β,21-isopropylidenedioxy-14-isopregnane (VII). Reductive opening of the epoxide rings of the latter compound, by treatment with lithium aluminum hydride, yields 3β,5β,14β-trihydroxy-20β,-21-isopropylidenedioxy-14-isopregnane (VIII). Conventional acetylation of compound (VIII), e.g. with acetic anhydride in pyridine, yields the corresponding 3β-acetate (IX, R=CH$_3$CO).

Acid hydrolysis of the acetonide group of the compound (IX) yields the corresponding tetrol (X, R=CH$_3$CO), 3β - acetoxy - 5β,14β,20β,21-tetrahydroxy-14-isopregnane, which is, in turn, acetylated in the conventional manner to yield the corresponding 3β,21-diacetoxy-5β,14β,20β-trihydroxy-14-isopregnane (XI, R=CH$_3$CO).

Selective oxidation of the 20β-hydroxy group of the latter compound with chromic oxide in dimethylformamide in the presence of sulfuric acid yields the corresponding 20-ketone (XII, R=CH$_3$CO), 3β,21-diacetoxy-5β,14β-dihydroxy-14-isopregnane-20-one. The latter compound (XII) is reacted with lithium-ethoxyacetylene to obtain 3β,21 - diacetoxy-20-ethoxyethynyl-5β,14β,20β-trihydroxy-14-isopregnane (XIII, R=CH$_3$CO).

Hydrolysis of the latter compound with alkali carbonate in lower alkanol yields a mixture of the corresponding pentahydroxy compound, 20-ethoxyethynyl-3β,5β,14β,20β,21-pentahydroxy-14-isopregnane (XIV) and of 3β,5β,14β,20-tetrahydroxy-20(22)-dihydrocardenolide (XIVa). Mild mineral acid treatment of either compound (XIV) or compound (XIVa) yields periplogenin (XVI). This mild acid treatment is preferably carrier out in a lower alkanol. Both hydrolysis of compound (XIII) and acid treatment of compound (XIV) or (XIVa) are carried out in liquid phase at a temperature up to about 30° C., preferably at room temperature.

Alternatively, the crude carbinol diacetate (XIII) may be rearranged under mild mineral acid conditions, preferably in a lower alkanol solvent, to yield the dihydroxy-diacetate (XV, R=CH$_3$CO), which need not be isolated and can undergo hydrolysis and cyclization under the same conditions to yield periplogenin (XVI). Alternatively, compound (XV) can be transformed into periplogenin (XVI) by mild alkali treatment of alkali carbonate in lower alkanol. Rearrangement and acid hydrolysis of compound (XII) or alkaline hydrolysis of compound (XV) are carried out in liquid phase at a temperature up to about 30° C., preferably at room temperature.

In the present specification, including examples and claims, the expression "room temperature," whenever it appears, is intended to mean a temperature between 20 and 25° C.

The following formulae and examples will illustrate this invention:

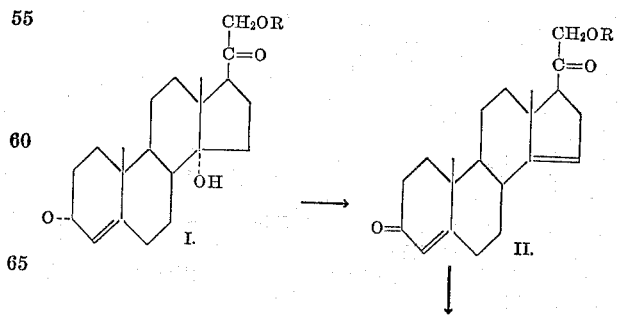

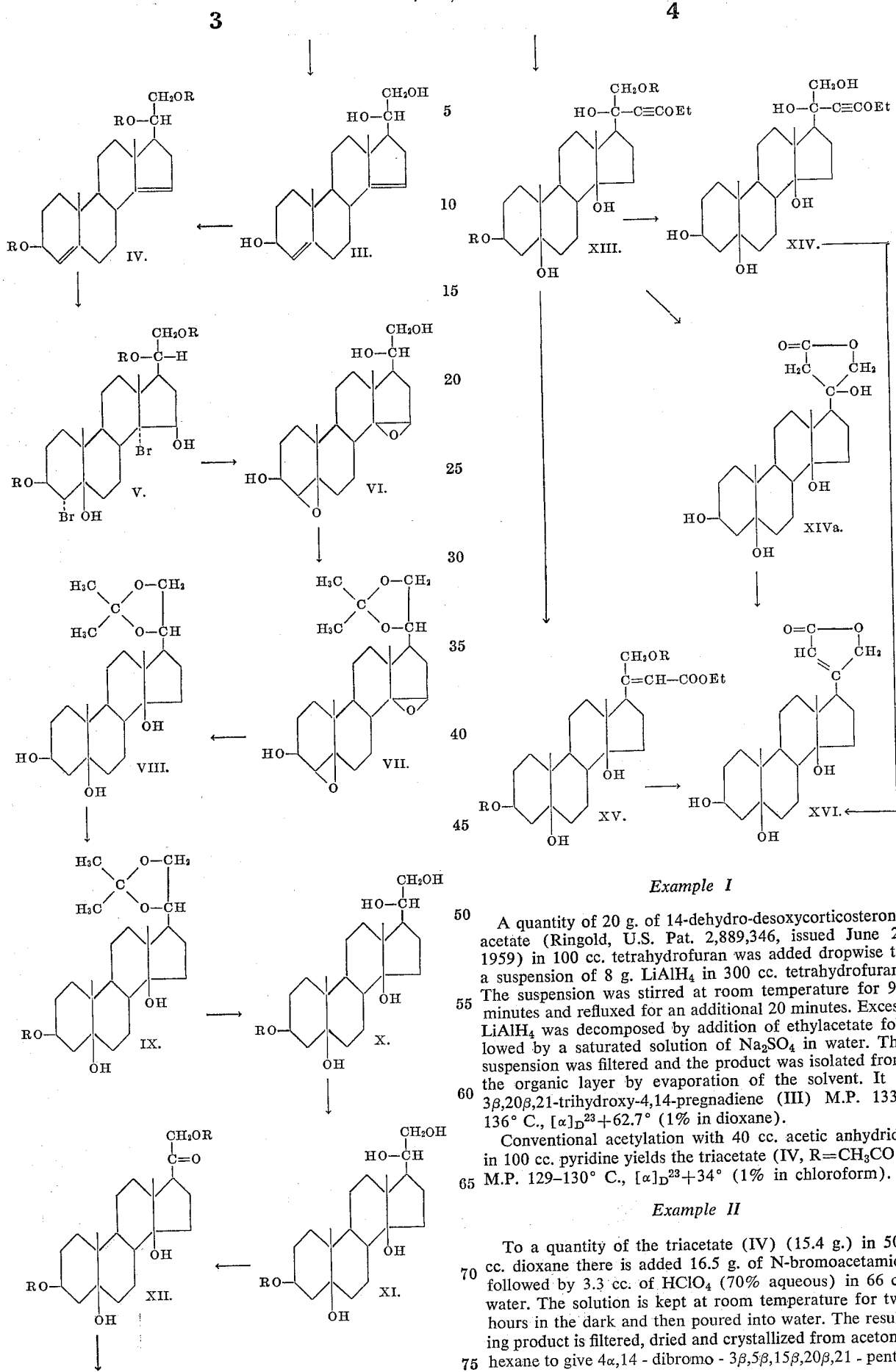

Example I

A quantity of 20 g. of 14-dehydro-desoxycorticosterone acetate (Ringold, U.S. Pat. 2,889,346, issued June 2, 1959) in 100 cc. tetrahydrofuran was added dropwise to a suspension of 8 g. LiAlH$_4$ in 300 cc. tetrahydrofuran. The suspension was stirred at room temperature for 90 minutes and refluxed for an additional 20 minutes. Excess LiAlH$_4$ was decomposed by addition of ethylacetate followed by a saturated solution of Na$_2$SO$_4$ in water. The suspension was filtered and the product was isolated from the organic layer by evaporation of the solvent. It is 3β,20β,21-trihydroxy-4,14-pregnadiene (III) M.P. 133–136° C., [α]$_D^{23}$+62.7° (1% in dioxane).

Conventional acetylation with 40 cc. acetic anhydride in 100 cc. pyridine yields the triacetate (IV, R=CH$_3$CO), M.P. 129–130° C., [α]$_D^{23}$+34° (1% in chloroform).

Example II

To a quantity of the triacetate (IV) (15.4 g.) in 500 cc. dioxane there is added 16.5 g. of N-bromoacetamide followed by 3.3 cc. of HClO$_4$ (70% aqueous) in 66 cc. water. The solution is kept at room temperature for two hours in the dark and then poured into water. The resulting product is filtered, dried and crystallized from acetone-hexane to give 4α,14 - dibromo - 3β,5β,15β,20β,21 - pentahydroxypregnane - 3β,20β,21-triacetate (V, R=CH₃CO), M.P. 138–139° C. (dec.). [a]_D^{23}+73° (1% in chloroform).

*Example III*

A quantity of 13.3 g. of the bis-bromohydrin (V) in 1l methanol was refluxed for one hour with 11.2 g. of KOH in 35 cc. water. The product was isolated with ether, washed with water and dried. Evaporation of the solvent afforded 4β,5β, 14β,15β - diepoxy - 3β,20β,21-trihydroxy-14-isopregnane (VI), M.P. 181–183° C., [α]_D^{23}−21.5° (1% in chloroform).

*Example IV*

A quantity of 3.62 g. of the bis-epoxide (VI) was dissolved in 500 cc. acetone and stirred at room temperature with 7.2 g. anhydrous CuSO₄ for 1.5 hours. Evaporation of the organic layer afforded 4β,5β,14β,15β-diepoxy-3β-hydroxy - 20β,21-isopropylidenedioxy-14-isopregnane (VII), M.P. 158–163° and 192–195° C., [α]_D^{23}+17.5° (1% in acetone).

*Example V*

A quantity of 4.52 g. of the acetonide (VII) in 600 cc. tetrahydrofuran was added during 15 minutes to a suspension of 6 g. LiAlH₄ in 250 cc. tetrahydrofuran. After stirring for one hour at room temperature the suspension was refluxed for 4.5 hours. The usual work-up gave 3β,5β,14β - trihydroxy - 20β,21 - isopropylidenedioxy-14-isopregnane (VIII) M.P. 201–203° C., [a]_D^{23}+33° (1% in acetone).

The corresponding 3β-acetate was obtained with acetic anhydride in pyridine in the usual way, (IX, R=CH₃CO), M.P. 154–156° C., [α]_D^{23}+46.4° (1% in chloroform).

*Example VI*

A quantity of 3.69 g. of acetate (IX) dissolved in 150 cc. methanol was hydrolyzed with 150 cc. 0.05 N H₂SO₄ at room temperature for 16 hours. The product was isolated by extraction with methylenechloride. It is 3β,5β, 14β,20β,21-pentahydroxy-14-isopregnane-3 - acetate (X), M.P. 207–209° C., [α]_D^{23}+29.9° (1% in chloroform).

A quantity of this product (4.22 g.) dissolved in 60 ml. dioxane was acetylated with 2.26 cc. of acetic anhydride and 2.26 cc. pyridine at 5° C. for 16 hours and at 50° C. for 90 minutes. Usual work-up afforded 3β,5β,14β, 20β,21 - pentahydroxy - 14-iso-pregnane-3β,21-diacetate (XI, R=CH₃CO) M.P. 155–156° C., [α]_D^{23}+30.9° C. (1% in chloroform).

*Example VII*

To a quantity of 1.17 g. of the diacetate (XI), dissolved in 20 cc. of dimethylformamide, there was added 1.2 g. chromic oxide followed by 20 cc. dimethylformamide containing 8 drops of concentrated H₂SO₄. After 16 hours at room temperature the mixture was extracted with CH₂Cl₂ and the known 3β,5β,14β,21-tetrahydroxy-14-isopregnan-20-one-3,21-diacetate (XII, R=CH₃CO), was obtained. M.P. 150–151° C. (A. Lardon, Helv. 32, 1517 (1949) gives M.P. 148–151° C.) [α]_D^{23}+75° (1% in chloroform).

*Example VIII*

A solution of ketone (XII), 105 mg. in 3 ml. benzene, was added to a suspension of lithium-ethoxyacetylene prepared from 35 mg. of lithium, 0.3 ml. bromobenzene and 0.4 cc. ethoxyacetylene in 11 cc. ether. Stirring was continued for one hour at 0° C. and for 2 hours at room temperature. 20-ethoxyethynyl-3β,5β,14β,20β,21-pentahydroxy-14-isopregnane-3β,21-diacetate (XIII, R=CH₃CO) was isolated by extracting the mixture with CH₂Cl₂. I.R. spectrum shows the characteristic acetylene band at 2250 cm.⁻¹.

The crude carbinol diacetate (XIII) was hydrolyzed with 100 mg. K₂CO₃ in 5 ml. methanol at room temperature for 16 hours and at the reflux temperature for 15 minutes. A mixture of the corresponding pentahydroxy compound, 20 - ethoxyethynyl-3β,5β,14β,20β,21-pentahydroxy-14-isopregnane (XIV) and of 3β,5β,14β,20-tetrahydroxy-20(22)-dihydrocardenolide (XIVa) was obtained. This mixture was dissolved in 4 cc. methanol to which 1.5 cc. of 0.05 N H₂SO₄ solution was added. The solution was stirred at room temperature for one hour, then extracted with CH₂Cl₂ to give a yellow oil from which the aglycone periplogenin was separated by chromatography. The I.R. of authentic and synthetic periplogenin were super-imposable.

Alternatively the crude carbinol (XIII) was rearranged under mild acid conditions (0.05 N H₂SO₄ in methanol at room temperature for one hour) to give the ester (XV, R=CH₃CO), which was further hydrolyzed under mild acid (e.g. 0.05 N H₂SO₄ in methanol at room temperature) or alkaline (e.g. K₂CO₃ in methanol at room temperature) conditions to give periplogenin (XVI).

I claim:
1. 3β,20β,21-trihydroxy-4,14 pregnadiene.
2. 4,14-pregnadiene-3β,20β-21-triacetate.
3. 4α, 14α - dibromo - 3β,5β,15β,20β,21-pentahydroxypregnane-3β,20β,21-triacetate.
4. 4β,5β,14β,15 - diepoxy - 3β,20β,21 - trihydroxy-14-isopregnane.
5. 4β,5β,14β,15β - diepoxy - 3β - hydroxy - 20β,21-isopropylidenedioxy-14-isopregnane.
6. The process for preparing 3β,5β,14β-trihydroxy-20 (22)-cardenolide which comprises subjecting 3β,21-diacetoxy - 20 - ethoxy - ethynyl-5β,14β,20β-trihydroxy-14-isopregnane to hydrolysis by treatment with an alkali carbonate in a lower alkanol in liquid phase at a temperature up to 30° C. to obtain a compound selected from a group consisting of 20-ethoxyethynyl-3β,5β,14β,20β,21-pentahydroxy - 14 - isopregnane and 3β,5β,14β,20-tetrahydroxy-20(20) dihydro-cardenolide and mixtures thereof and treating the said compound thus obtained with a dilute mineral acid.
7. The process for preparing 3β,5β,14β-trihydroxy-20 (22)-cardenolide which comprises rearranging 3β,21-diacetoxy - 20-ethoxy-ethynyl-5β,14β,20β-trihydroxy-14-isopregnane by reacting said compound with a dilute mineral acid in liquid phase at a temperature up to 30° C. to yield 20-carbethoxymethylene-3β,21-diacetoxy-5β,14β-dihydroxy-14-isopregnane, and hydrolizing and cyclizing said latter compound by treating it, in liquid phase and in a lower alkanol, at a temperature up to 30° C., with a reagent selected from the group consisting of dilute mineral acids and alkali carbonates.
8. The process as claimed in claim 7, wherein said 20-carbethoxymethylene-3β,21-diacetoxy-5β,14β - dihydroxy-14-isopregnane is not isolated, but is hydrolyzed and cyclized by reacting with a dilute mineral acid.
9. The process as claimed in claim 6, wherein said mineral acid is selected from the group consisting of 0.05 N HCl and 0.05 N H₂SO₄.
10. The process as claimed in claim 7, wherein said mineral acid is selected from the group consisting of 0.05 N HCl and 0.05 N H₂SO₄.
11. The process as claimed in claim 6, wherein said alkali carbonate is potassium carbonate.
12. The process as claimed in claim 6, wherein said 3β,21 - diacetoxy - 20 - ethoxyethynyl-5β,14β,20β-trihydroxy-14-isopregnane is obtained by treating 3β,5β,14β-trihydroxy - 20β,21 - isopropylidenedioxy-14-isopregnane 3β-acetate with a mineral acid under mild conditions to obtain 3β-acetoxy-5β,14β,20β,21-tetrahydroxy 14-isopregnane.
13. The process as claimed in claim 6, wherein said 3β,21 - diacetoxy - 20 - ethoxyethynyl-5β,14β,20β-trihydroxy-14-isopregnane is obtained by treating said compound to obtain 3β,21-diacetoxy-5β,14β,20β-trihydroxy-14-isopregnane.

14. The process as claimed in claim 6, wherein said 3β,21-diacetoxy-20-ethoxyethynyl-5β,14β,20β-trihydroxy-14-iso-pregnane is obtained by treating said compound with chromic oxide in dimethylformamide in the presence of sulfuric acid to obtain 3β,21-diacetoxy-5β,14β-dihydroxy-14-isopregnane-20-one.

15. The process as claimed in claim 6, wherein said 3β,21-diacetoxy-20-ethoxyethynyl-5β,14β,20β-trihydroxy-14-isopregnane is obtained by reacting said compounds with lithium-ethoxyacetylene.

No references cited.

LEWIS, GOTTS, *Primary Examiner.*

ELBERT ROBERTS, *Assistant Examiner.*